(12) United States Patent
Osterländer et al.

(10) Patent No.: US 7,100,926 B2
(45) Date of Patent: Sep. 5, 2006

(54) ROLL STABILIZER WITH FAILSAFE DEVICE FOR THE CHASSIS OF A MOTOR VEHICLE

(75) Inventors: Jürgen Osterländer, Emskirchen (DE); Manfred Kraus, Herzogenaurach (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/113,797

(22) Filed: Apr. 25, 2005

(65) Prior Publication Data

US 2005/0212224 A1 Sep. 29, 2005

Related U.S. Application Data

(63) Continuation of application No. PCT/EP2003/011115, filed on Oct. 8, 2003.

(30) Foreign Application Priority Data

Oct. 25, 2002 (DE) ................ 102 50 068

(51) Int. Cl.
  *B60G 17/005* (2006.01)
  *B60G 21/055* (2006.01)

(52) U.S. Cl. ................ 280/5.502; 280/5.511

(58) Field of Classification Search ............ 280/5.501, 280/5.502, 5.506, 5.511, 124.106, 124.107, 280/124.152

See application file for complete search history.

(56) References Cited

U.S. PATENT DOCUMENTS

| | | | | |
|---|---|---|---|---|
| 4,919,440 A | * | 4/1990 | Tsukamoto | 280/5.502 |
| 5,092,625 A | * | 3/1992 | Kawabata | 280/5.501 |
| 5,251,926 A | * | 10/1993 | Aulerich et al. | 280/124.152 |
| 6,022,030 A | * | 2/2000 | Fehring | 280/5.511 |
| 6,039,326 A | * | 3/2000 | Agner | 280/5.506 |
| 6,428,019 B1 | * | 8/2002 | Kincad et al. | 280/5.511 |
| 6,439,583 B1 | * | 8/2002 | Markowetz | 280/5.511 |
| 6,637,757 B1 | * | 10/2003 | Ignatius et al. | 280/5.511 |
| 2002/0121748 A1 | | 9/2002 | Ignatius et al. | |
| 2003/0116928 A1 | * | 6/2003 | Heller et al. | 280/5.501 |

FOREIGN PATENT DOCUMENTS

| | | |
|---|---|---|
| DE | 196 13 769 | 10/1996 |
| DE | 196 46 500 | 1/1998 |
| DE | 10002455 A1 * | 7/2001 |
| DE | 102 05 932 | 8/2003 |
| FR | 2 670 716 | 6/1992 |
| GB | 2 220 625 | 1/1990 |

* cited by examiner

*Primary Examiner*—Paul N. Dickson
*Assistant Examiner*—Laura B. Rosenberg
(74) *Attorney, Agent, or Firm*—Volpe and Koenig, P.C.

(57) ABSTRACT

Roll stabilizer for the chassis of a motor vehicle having an actuator (3) arranged between stabilizer halves (1, 2) and rotating them relative to one another around a rotational axis, when necessary. The actuator (3) is provided with a failsafe device (34), which connects the two stabilizer halves (1, 2) in a torque proof manner, when necessary.

5 Claims, 2 Drawing Sheets

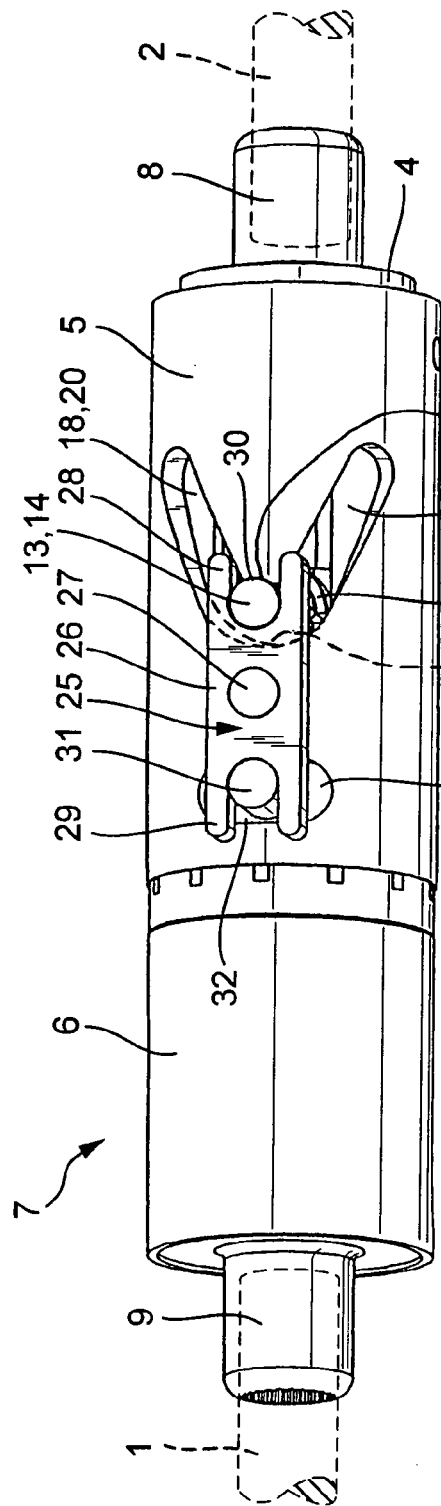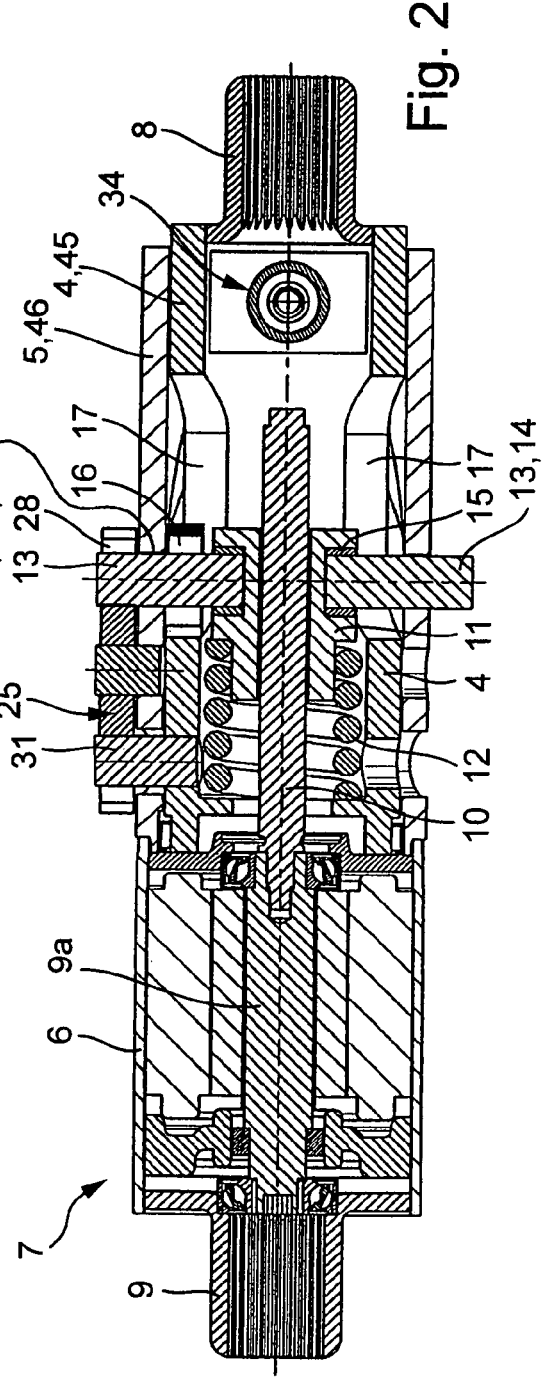

ROLL STABILIZER WITH FAILSAFE DEVICE FOR THE CHASSIS OF A MOTOR VEHICLE

CROSS-REFERENCE TO RELATED APPLICATIONS

This application is a continuation of PCT/EP2003/011115, filed Oct. 8, 2003, which is incorporated herein by reference as if fully set forth.

BACKGROUND

The present invention relates to a roll stabilizer for the chassis of a motor vehicle. The purpose of these stabilizers is to reduce the tendency for the chassis to roll when driving through turns and to influence the behavior when driving through turns, i.e. to improve driving safety. In general, the stabilizer remains without any effect during equilateral suspension.

From DE 100 02 455 A1, for example, a vehicle roll stabilizer has been known with its actuator comprising two actuator components, each of which are mounted in a torque proof manner to a stabilizer half. Via an actuating drive and a secondary transmission, a rotation of the two actuator components around the rotational axis can occur in order to rotate the stabilizer halves in relation to one another. In the known roll stabilizer, the two actuator components form curved path carriers provided with curved paths as parts of a cam drive. Electromechanical or hydraulic actuating drives may be provided. When engaging the actuating drive, the controlling torque is created, which counteracts any vehicle rolling moment, thus improving driving safety.

SUMMARY

The object of the present invention is to provide a vehicle roll stabilizer in which driving safety is further improved.

According to the invention, the object is attained in that the actuator is provided with a failsafe device, which connects the two stabilizer halves in a torque transferring manner, when necessary. The failsafe device can be activated when, for example, the actuator is overstressed or malfunctions. In the event of such a malfunction, an uncontrolled rotation of the two stabilizer halves in relation to one another is prevented by the failsafe device. Therefore, a vehicle roll stabilizer according to the invention achieves an improvement in driving safety.

Preferably, the failsafe device is effectively located between two actuator components of the actuator, which are connected in a torque transferring manner to the two stabilizer halves. Conventionally, the actuating drive cooperates with these two actuator components. In the vehicle roll stabilizer according to the invention, the actuator components can be embodied as curved path carriers, similar to the ones of the vehicle roll stabilizer known, which are parts of a cam drive, in order to rotate the actuator components in relation to one another. Advantageously, these two actuator components can simultaneously be used for preventing rotation during the failsafe mode. For example, a locking mechanism can be provided as a failsafe device. Preferably, this locking mechanism comprises a lock bolt, which, in a passive position, is not engaging the two actuator components and, in an active position, is engaging the two actuator components. In a simple manner, catches for the engagement of the lock bolt can be embodied in one of the two actuator components or in both actuator components. Based, for example, on the vehicle roll stabilizer known from DE 100 02 455 A1, the two curved path carriers described there form the actuator components. These actuator components can be provided in a simple manner both with the curved paths as well as with the catches for the engagement of the lock bolt.

Preferably, the lock bolt is held in its passive position by an electromagnetic force. In a practical embodiment of the invention, an electromagnet can be provided, which is energized during the operation of the vehicle roll stabilizer and, thus, acts on the lock bolt with an electromagnetic force, which counteracts a spring tension, attempting to move the lock bolt out of its passive position into its active position. For example, if an electrical connection to the vehicle roll stabilizer is being interrupted, the actuating drive malfunctions, and the electromagnetic force collapses as well. After this force ceases, the lock bolt can now be moved from its passive position into its active position either by way of the spring tension or a pre-stressed spring or by way of centrifugal force. When, for example, the locking mechanism is mounted to one of the two actuator components and rotates the other actuator component in reference to the first actuator component, a catch can be provided at the other actuator component such that, at a predetermined angle of rotation, the lock bolt aligns with this catch and finally engages this catch. This way, a formfitting connection between these two actuator components is ensured and, thus, also a rotation of the two stabilizer halves with respect to one another is prevented.

In a particularly advantageous manner, failsafe devices according to the present invention can be integrated in vehicle roll stabilizers, in which the actuator is provided with two nested actuator components, which are rotatable around a common rotational axis in reference to one another, with the lock bolt being oriented laterally in reference to the rotational axis and capable of being moved from its passive position into its active position by way of shifting laterally to the rotational axis. The locking occurs at a point of the vehicle roll stabilizer distant from the rotational axis so that, due to the increased lever arm, the forces acting on the bolt and the catch are reduced and securely transferred in the circumferential direction.

BRIEF DESCRIPTION OF THE DRAWINGS

In the following, the invention is explained in greater detail using one of the three figures showing an exemplary embodiment. Shown are:

FIG. 1: a vehicle roll stabilizer according to the invention in a perspective representation FIG. 2: the vehicle roll stabilizer according to the invention in a longitudinal cross-section.

DETAILED DESCRIPTION FO THE PREFERRED EMBODIMENT

Figure 3:
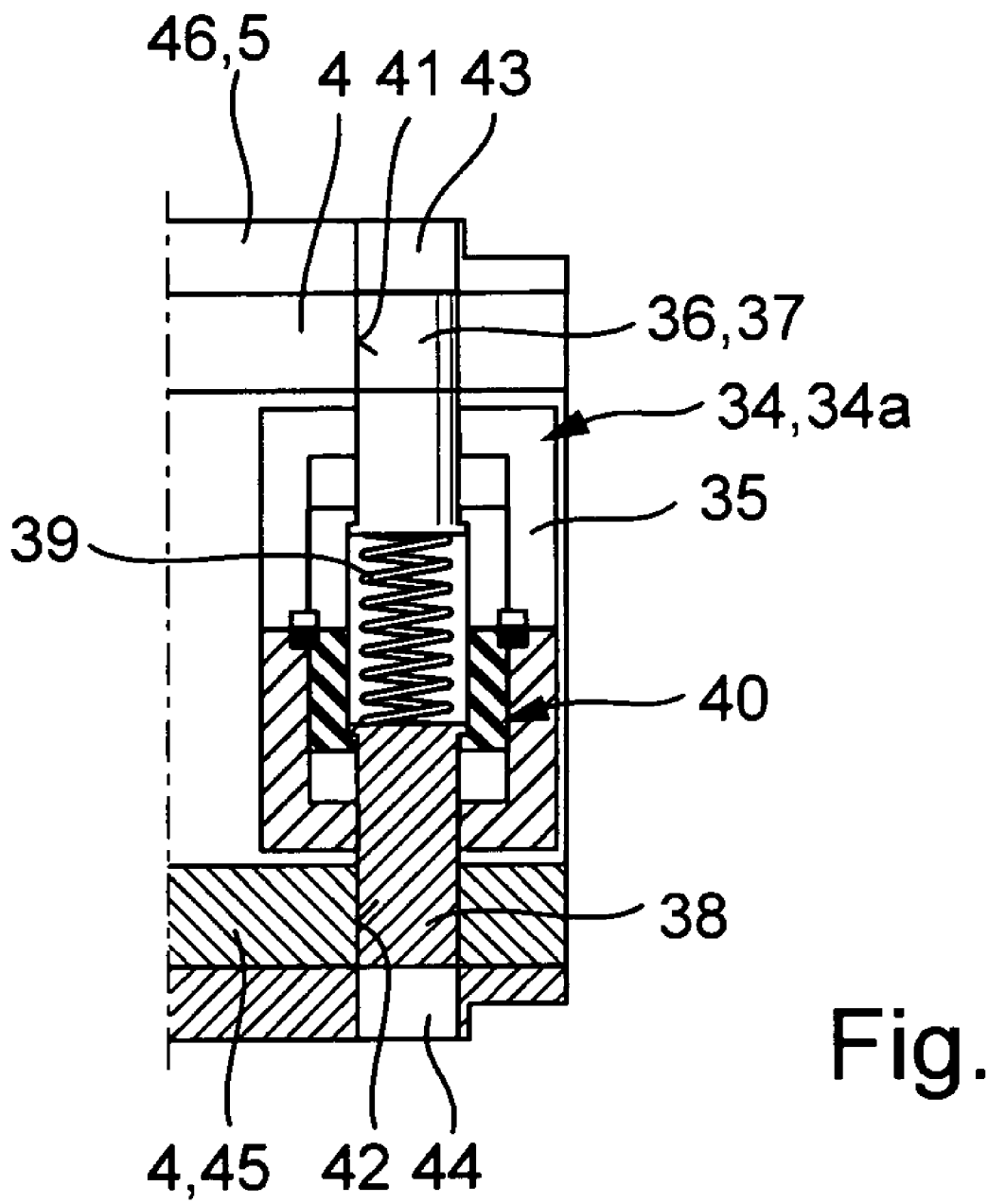
FIG. 3: a partial view of FIG. 2 in another cross-section.

The roll stabilizer according to the invention for the chassis of a motor vehicle shown in FIGS. 1 through 3 comprises stabilizer halves 1, 2, which are only shown in dashed lines, here. Between the stabilizer halves 1, 2, an actuator 3 is provided. When necessary, the actuator 3 rotates the two stabilizer halves 1, 2 around the rotational axis of the actuator 3 relative to one another.

The actuator 3 is provided with two coaxially nested curved path carriers 4, 5. The two curved path carriers 4, 5 are formed tube-shaped and are rotatable relative to one another. With its left end, as shown in FIG. 2, the exterior curved path carrier 5 is mounted to the housing 6 of an electric motor 7. The curved path carrier 4 and the housing 6, facing in the opposite direction, are each provided, at their end faces, with a pin catch 8, 9 for the torque proof acceptance of the ends of the stabilizer halves 1, 2. The curved path carriers 4, 5 form actuator components 45, 46, that are rotatable around a rotational axis in reference to one another.

A threaded spindle 10 is mounted to a rotor 9a of the electric motor 7. The threaded spindle 10 is coaxially aligned with the curved path carriers 4, 5. A threaded nut 11 is rotatably arranged on the threaded spindle 10 in the manner of a known ball screw; a relative rotation of the threaded spindle 12 in reference to the spindle nut 11 is transferred into an axial motion of the threaded nut 11 in reference to the curved path carriers 4, 5.

A helical compression spring 12, coaxially arranged on the threaded spindle 10, is supported, on the one hand, on the curved path carrier 4 and, on the other hand, on the spindle nut 11 in a spring-loaded fashion. The spindle nut 11 carries a coupling element 13, which is necessary for the rotation of the two curved path carriers 4, 5, in reference to one another, as further explained in the following. The coupling element 13 comprises several adjustment pins 14, distributed over the circumference of the threaded nut 11, which are arranged in the shape of a star around the rotational axis of the actuator 3. The adjustment pins 14 are accepted at the threaded nut 11 in radial bearings 15, pivotal around their longitudinal axis. Support rolls 16 are rotationally supported on the adjustment pins 14.

At several locations, the curved path carrier 4 is provided with curved paths 17, distributed over the circumference and arranged parallel to the rotational axis of the actuator 3. Distributed over its circumference, the curved path carrier 5 is provided at several locations each with a V-shaped curved path 18, having curved path legs 19, 20, arranged in an approximately V-shaped manner in relation to one another and in a mirror image symmetrically arranged in reference to a longitudinally extending central plane containing the rotational axis of the actuator 3. The V-shaped curved path 18 and/or its curved path legs 19, 20 are clearly discernible from FIGS. 1 and 3. The coupling elements 13 couple the two curved path carriers 4, 5 to one another. For this purpose, the adjustment pins 14 each engage both the curved path 17 as well as the V-shaped curved path 18. The support rolls 16 cooperate with the curved path 17, while the adjustment pins 14 each cooperate with their circumference with the V-shaped curved path 18. The two curved path legs 19, 20 of each V-shaped curved path 18 cross at an interface 31 contained in the longitudinal central plane, as indicated in FIG. 3. In a neutral position of the actuator 3 the coupling element 14, i.e. the adjustment pin 14, is located in the interface 21. For the flaw free positioning of the adjustment pin 14, a stop position 23 is provided in a forward position at the interior wall 22 of the V-shaped curved path 18. This stop position 23 for the coupling element 13, i.e., here, the adjustment pin 14, is arranged laterally in reference to the rotational axis of the actuator 3 and forms a platform 24.

In the present invention, an electro mechanic actuating drive is provided, which comprises the above-described electric motor 7 with the ball screw connected thereto. When the rolling of the vehicle body is to be counteracted, the two stabilizer halves in the active vehicle roll stabilizers are rotated against the effective rolling moment. Here, the rotation is achieved such that by activating the electric motor 7 the threaded nut 11 is shifted axially, with the adjustment pins 14 provided in one of the curved path legs 19, 20 each, being shifted along one of the two curved path legs 19, 20. This means that the exterior curved path carrier 5 is being rotated with respect to the adjustment pin 14 and in reference to the curved path carrier 4. When the adjustment pin 14 is arranged in the curved path leg 19, a relative torsion occurs in a counter clock-wise direction. When the adjustment pin 14 is arranged in the curved path leg 20, a relative torsion occurs in a clock-wise direction.

Depending on the orientation of the acting rolling moment, it must be selected into which of the two curved path legs 19, 20 the adjustment pin 14 shall be directed, starting from its neutral position in the interface 21. For this purpose, a control 25 is to be provided according to FIGS. 1 and 2, by which the coupling element 13 can be selectively directed from its neutral position into one of the two curved path legs 19, 20. This control 25 comprises a tilting bar 26, pivoting around a tilting axis 27. The tilting axis 27 is oriented laterally to the rotational axis of the actuator 3; one end 28 of the tilting bar engages the coupling element 13 and the other end 29 of the tilting bar engages the other curved path carrier 4. In the present exemplary embodiment, the adjustment pin 14 engages into a U-shaped seating 30 of the tilting bar 26 at its end 28 of the tilting bar. At the other end 29 of the tilting bar, pins 31 each engage a U-shaped seating 32 at the other end 29 of the tilting bar. The tilting axis 27 is mounted to the curved path carrier 5.

This control 25 can advantageously utilize the rolling moment for directing the coupling element 13 into the appropriate curved path leg 19, 20 of the V-shaped curved path. When, for example, at a rolling moment a relative torsion between the two stabilizer halves 1, 2 is initiated in a clock-wise direction, the pin 31 also pivots in a clock-wise direction and shifts in the circumferential direction in reference to the curved path carrier 5. This relative torsion in reference to the curved path carrier 5 is possible because grooves 33 are formed on the curved path carrier 5 in circumferential direction, which the pin 31 penetrates. Now, the tilting bar 26 also pivots with its end 29 of the tilting bar in a clock-wise direction and/or upward, with reference to FIG. 1. Now, the tilting bar 26 pivots with its end 28 of the tilting bar in a counter clock-wise direction, i.e., downward, with reference to FIG. 1. By this pivoting motion of the end 28 of the tilting bar, the adjustment pin 14 is shifted out of its stop position 23 and into the curved path section 19. Now, the helical spring 12 presses the spindle nut 11 axially to the right. This motion is supported by the activation of the electric motor 7, which drives the threaded spindle 10. The further the coupling element 13 is shifted to the right, the larger the rotation between the two curved path carriers 4, 5, thus actively counteracting the rolling moment.

The helical spring 12 is connected to the electric motor 7. In the starting phase of the electric motor 7, the pre-stressed helical spring 12 supports the desired adjustment process with the full force of its tension. Using a suitable control, the motor 7 can be controlled such that, after the rolling moment has ceased, the coupling element 13 is returned to its neutral position with the helical spring 12 regaining the full force of its tension.

In order to prevent, in the event of a power failure, the uncontrolled rotation of the two stabilizer halves 1, 2 relative to one another, the invention provides a failsafe device 34, which connects the two stabilizer halves 1, 2 in a torque tranferring manner in the event of such an emergency situation. Such a failsafe device 34 is certainly independent from any specific embodiment of the actatuting drive or the transmission. The failsafe device 34 is also independent from the helical spring 12 described in this exemplary embodiment.

FIG. 3 shows an enlarged section of the vehicle roll stabilizer according to the invention as depicted in FIGS. 1 and 2. The failsafe device 34 is allocated on the inside of the curved path carrier 4, formed in a tube-shaped manner, which is here formed by a locking mechanism 34a. It comprises a housing 35 and a two-part lock bolt 36 arranged therein, shiftable therein in the longitudinal direction. Between the lock bolt parts 37, 38, a helical pressure spring 39 is arranged coaxially in reference to the lock bolt 36. The lock bolt 36 is arranged laterally to the rotational axis of the actuator 3. An energized electromagnet 40 is indicated, which keeps the two lock bolt parts 37, 38 in an inserted position in the fail-safe device 34, under the compression of the helical pressure spring 39. The two lock bolt parts 37, 38 engage the bores 41, 42 of the interior curved path carrier 4 or the actuator component 45. The exterior curved path carrier 5 or the actuator component 46 is provided with corresponding catches 43, 44, which align to the bores 41, 42 at a predetermined rotational position of the curved path carriers 4, 5. A multitude of catches 43, 44 may be distributed behind one another over the circumference, in order to allow for the actuator components 45, 46 to engage as soon as possible in the fail-safe mode, without any wide rotation angle.

For example, as a result of a power failure, the electric motor can no longer maintain the defined rotational position of the stabilizer halves 1, 2 in reference to one another. Here, the power supply for the electromagnet 40 also fails. In this situation, the ecletromagnetic force ceases, which keeps the lock bolt 36 in its inserted position against the spring force of the helical pressure spring 39. Now, under the force of the pre-stressed helical pressure spring 39, the lock bolt parts 37, 38 press radially outward and, thus leave their passive position. As soon as the bores 41, 42 of the interior curved path carrier 4 align with the corresponding catches 43, 44 of the exterior curved path carrier 5, the lock bolt parts 37, 38 insert into these catches 43, 44 so that the two curved path carriers 4, 5 are connected to one another in a torque tranferring manner. In this situation, the lock bolt parts 37, 38 have assumed their active position. Therefore, the stabilizer halves 1, 2 of the vehicle roll stabilizer are now also connected to one another in a torque proof manner. Driving safety is therefore increased compared to a vehicle roll stabilizer, in which no failure device is provided.

LIST OF REFERENCE CHARACTERS

1 Stabilizer half
2 Stabilizer half
3 Actuator
4 Curved path carrier
5 Curved path carrier
6 Housing
7 Electric motor
8 Pin catch
9 Pin catch
9a Rotor
10 Threaded spindle
11 Spindle nut
12 Helical spring
13 Coupling element
14 Adjustment pin
15 Radial bearing
16 Support roller
17 Curved path
18 V-shaped curved path
19 Curved path leg
20 Curved path leg
21 Interface
22 Interior wall
23 Stop position
24 Platform
25 Control
26 Tilting bar
27 Axis of tilting bar
28 End of tilting bar
29 End of tilting bar
30 Seating
31 Pin
32 Seating
33 Groove
34 Failsafe device
34a Locking mechanism
35 Housing
36 Lock bolt
37 Lock bolt part
38 Lock bolt part
39 Helical pressure spring
40 Electromagnet
41 Bore
42 Bore
43 Catch
44 Catch
45 Actuator component
46 Actuator component

The invention claimed is:

1. Roll stabilizer for a chassis of a motor vehicle, comprising an actuator (3), arranged between stabilizer halves (1,2) and rotating them relative to one another around a rotational axis, when necessary, the actuator (3) is provided with a failsafe device (34), to connect the two stabilizer halves (1, 2) in a torque transferring manner upon activation, an actuator component (46) is connected in a torque transferring manner to one of the stabilizer halves (1) and another actuator component (45) is connected to the other of the stabilizer halves (2), with the failsafe device (34) being arranged effectively between the two actuator components (45, 46), the failsafe device (34) is provided with a locking mechanism (34a), which, in a failsafe mode, locks the two actuator components (45, 46) to one another in a torque transferring manner, wherein the locking mechanism (34a) is provided with a lock bolt (36), which, in a passive position, does not engage the two actuator components (45,46) and, in an active position, engages the two actuator components (45, 46).

2. Roll stabilizer according to claim 1, wherein at least one of the two actuator components (46) is provided with a catch (43, 44) for the lock bolt to engage (36).

3. Roll stabilizer according to claim 1, wherein the lock bolt (36) is held in the passive position by an electromagnetic force.

4. Roll stabilizer according to claim 1, wherein the lock bolt (36) can be shifted out of the passive position into the active position by a spring force of a pre-stressed spring (39).

5. Roll stabilizer according to claim 1, wherein the actuator (3) is provided with two nested actuator components (45, 46) rotatable relative to one another around a common rotational axis, and the lock bolt (36) being provided laterally to the rotational axis and laterally shiftable to the rotational axis out of the passive position into the active position.

* * * * *